(12) United States Patent
Devillers et al.

(10) Patent No.: US 8,955,799 B2
(45) Date of Patent: Feb. 17, 2015

(54) AIRCRAFT LANDING GEAR STOP PAD

(75) Inventors: Christophe Devillers, Gloucester (GB); Ben Hodgkinson, Cheltenham (GB)

(73) Assignee: Messier-Dowty Limited, Gloucester (GB)

( * ) Notice: Subject to any disclaimer, the term of this patent is extended or adjusted under 35 U.S.C. 154(b) by 185 days.

(21) Appl. No.: 13/583,261

(22) PCT Filed: Feb. 16, 2011

(86) PCT No.: PCT/GB2011/050308
§ 371 (c)(1),
(2), (4) Date: Nov. 7, 2012

(87) PCT Pub. No.: WO2011/110829
PCT Pub. Date: Sep. 15, 2011

(65) Prior Publication Data
US 2013/0264417 A1    Oct. 10, 2013

(30) Foreign Application Priority Data
Mar. 11, 2010 (GB) .................................. 1004033.5

(51) Int. Cl.
B64C 25/52 (2006.01)
B64C 25/02 (2006.01)
B64C 25/00 (2006.01)
B64C 25/34 (2006.01)
B64C 25/58 (2006.01)
B64D 45/00 (2006.01)

(52) U.S. Cl.
CPC .............. *B64C 25/02* (2013.01); *B64C 25/001* (2013.01); *B64C 25/34* (2013.01); *B64C 25/58* (2013.01); *B64D 2045/008* (2013.01)
USPC .................................. 244/100 R; 244/102 A

(58) Field of Classification Search
USPC ................... 244/100 R, 102 R, 102 A, 103 R
See application file for complete search history.

(56) References Cited

U.S. PATENT DOCUMENTS

| 2,864,624 | A | * | 12/1958 | Dreyer et al. | .................... 280/11 |
| 4,850,552 | A | * | 7/1989 | Darden et al. | ............ 244/100 R |
| 5,460,340 | A | * | 10/1995 | White | ........................ 244/102 A |
| 7,731,124 | B2 | * | 6/2010 | Griffin | ...................... 244/102 R |
| 8,376,272 | B2 | * | 2/2013 | Bennett et al. | ........... 244/102 SL |
| 8,382,032 | B2 | * | 2/2013 | Bennett et al. | ............. 244/102 R |

(Continued)

FOREIGN PATENT DOCUMENTS

| GB | 2452938 | 3/2009 |
| WO | 2011048394 | 4/2011 |

OTHER PUBLICATIONS

Chinese Intellectual Property Office, Chinese Patent Application No. 201180012664.4, Office Action dated Jun. 26, 2014, pp. 1-10 (includes translation pages).

(Continued)

*Primary Examiner* — Christopher P Ellis
*Assistant Examiner* — Medhat Badawi
(74) *Attorney, Agent, or Firm* — Hunton & Williams LLP

(57) ABSTRACT

A stop pad (11) for an aircraft landing gear arranged to provide protection against impact between first and second elements of the landing gear, the stop pad being arranged to provide an indication that it is been subject to an impact against one of the first or second landing gear elements, the impact having an impact load above a predetermined threshold level.

27 Claims, 5 Drawing Sheets

(56) References Cited

U.S. PATENT DOCUMENTS

Figure 1:
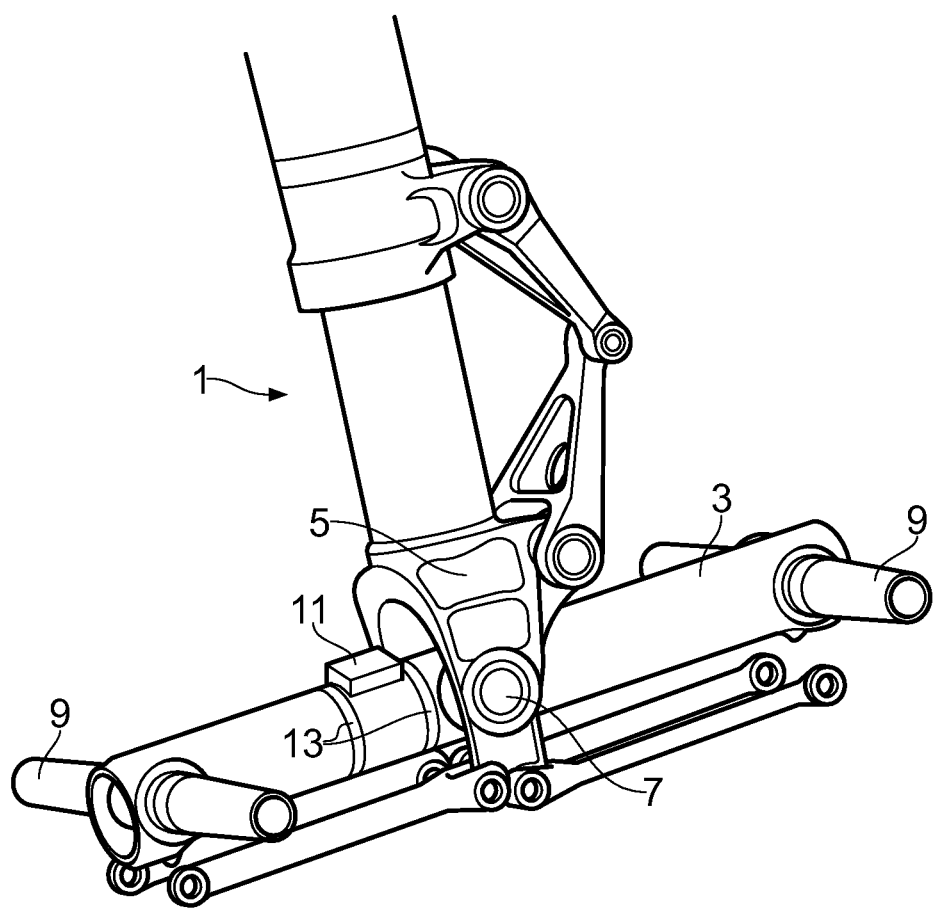

| | | | | |
|---|---|---|---|---|
| 8,398,020 | B2* | 3/2013 | Bennett et al. | 244/102 SL |
| 8,650,967 | B2* | 2/2014 | Bennett | 73/802 |
| 2003/0033927 | A1* | 2/2003 | Bryant et al. | 91/471 |
| 2009/0050736 | A1* | 2/2009 | Bennett et al. | 244/102 R |
| 2009/0139341 | A1* | 6/2009 | Cooper | 73/802 |
| 2010/0116930 | A1* | 5/2010 | Griffin | 244/102 A |
| 2010/0257923 | A1* | 10/2010 | Bennett | 73/117.03 |
| 2010/0257946 | A1* | 10/2010 | Inns et al. | 73/862.57 |
| 2011/0303787 | A1* | 12/2011 | Bennett | 244/100 R |
| 2012/0091271 | A1* | 4/2012 | Bennett et al. | 244/102 R |
| 2012/0112001 | A1* | 5/2012 | Bennett et al. | 244/102 SS |
| 2012/0119025 | A1* | 5/2012 | Bennett et al. | 244/102 R |
| 2012/0126055 | A1* | 5/2012 | Lindahl et al. | 244/104 FP |
| 2012/0256050 | A1* | 10/2012 | Hilliard et al. | 244/100 R |
| 2013/0264417 | A1* | 10/2013 | Devillers et al. | 244/100 R |

OTHER PUBLICATIONS

European Patent Office, European Patent Application No. 11705238.1, Communication Pursuant to Article 94(3) EPC dated Aug. 13, 2014, pp. 1-5.

* cited by examiner

AIRCRAFT LANDING GEAR STOP PAD

A typical arrangement of the main landing gear of medium to large aircraft includes a telescopic shock absorbing landing gear strut pivotally connected to a bogie beam to which a number axles and wheel pairs are mounted. In normal operation there is sufficient clearance between the bottom of the landing gear strut and the bogie beam to allow the bogie beam to rotate relative to the landing gear strut, for example during take-off and landing manoeuvres and optionally to aid stowage of the landing gear within the aeroplane when the landing gear is retracted.

However, in certain abnormal circumstances the bogie beam may be caused to undergo a greater degree of rotation than normal such that it strikes the landing gear strut and/or other parts of the landing gear. To prevent damage to either the bogie beam or other elements of the landing gear in the event of such an impact it is known to provide one or more stop pads on the bogie beam such that in the event of excess rotation of the bogie beam the stop pad strikes the landing gear strut rather than the bogie beam itself, thus mitigating damage to the bogie beam itself.

Even with the provision of such stop pads there is a possibility of unseen damage to the bogie beam in the event of the bogie beam striking the landing gear strut with particularly high impact load. It would therefore be beneficial for there to be some kind of indication that the bogie beam has experienced an impact load above a predetermined threshold, to provide an indication that further examination or replacement of the bogie beam is required.

According to a first aspect of the present invention there is provided a stop pad for an aircraft landing gear arranged to provide protection against impact between first and second elements of the landing gear, the stop pad being arranged to provide an indication that it is been subject to an impact against one of the first or second landing gear elements, the impact having an impact load above a predetermined threshold level.

Preferably the indication is a visual indication.

The visual indication may comprise the deformation of one or more external surfaces of the stop pad.

Additionally, the external surface of the stop pad may have one or more recesses formed therein and the visual indication comprises the deformation of at least one of these recesses.

Additionally, or alternatively, the stop pad may comprise a sintered material.

In further embodiments the visual indication may comprise the at least partial egress of a substance from the stop pad.

Additionally, the stop pad may comprise at least one layer of the substance extending to an edge of the stop pad, wherein the substance has a plastic yield point equal to the predetermined threshold level such that when the stop pad is subject to an impact load above the predetermined threshold level, at least a portion of the layer of the substance is extruded beyond the edge of the stop pad.

Additionally, the stop pad may comprise multiple layers of the substance.

Additionally, at least two of the multiple layers may have different plastic yield points.

Alternatively, the stop pad may comprise at least one cavity in which the substance is arranged to be located and at least one external orifice connected to the internal cavity, the internal cavity being arranged to be compressed when the stop pad is subject to an impact load such that at least some of the substance is urged out of the orifice when the impact load exceeds the predetermined threshold level.

Additionally, the substance may have a plastic yield point equal to the predetermined threshold level.

Alternatively, the substance may comprise a fluid and the orifice may be fluidly sealed by sealing means, the sealing means being arranged to allow egress of the fluid through the orifice when the stop pad is subject to an impact load above the predetermined threshold level.

Additionally, the fluid may comprise an incompressible fluid.

Additionally or alternatively, the stop pad may comprise a plurality of fluidly connected internal cavities.

In a further embodiment the stop pad may comprise a main body arranged to elastically deform when subject to an impact load, a first band formed around a periphery of the main body and arranged to expand as the main body deforms, and a second band formed around the first band and arranged to rupture when the first band expands by a predetermined extent corresponding to the extent of expansion caused by the deformation of the main body when the stop pad is subject to an impact load exceeding the predetermined threshold level.

Additionally, the stop pad may further comprise at least one plate formed across the main body to inhibit deformation of the main body in a direction substantially normal to the plate.

Additionally or alternatively, the main body, first and second bands may be substantially circular.

Additionally or alternatively the first band may include braided fibers.

Additionally or alternatively, the second band may include linear wound fibers.

Additionally or alternatively, the main body may comprise a rubber or polymer material.

According to further embodiments the stop pad may include at least one recess formed in the stop pad, the recess being arranged to plastically deform when the stop pad is subjected to an impact load above the predetermined threshold level, the deformation of the recess providing said indication.

Additionally, the recess may comprise a hole formed through the stop pad.

Additionally or alternatively, the occurrence of deformation of the recess is controlled by one or more of the size, shape, orientation and location of the recess.

According to further embodiments of the present invention the stop pad may have at least one blind recess formed therein, the blind recess being arranged to promote a fracture forming in the stop pad when the stop pad is subject to an impact load above the predetermined threshold, the fracture allowing the escape of a pressurized fluid introduced into the recess to provide said indication.

Additionally, the blind recess may comprise one or more connected holes formed through the stop pad, with each end of the holes accept one being sealed.

Additionally or alternatively, the formation of a fracture is controlled by one or more of the size, shape, orientation and location of the recess.

According to a further aspect of the present invention there is provided an aircraft landing gear comprising a bogie beam and a stop pad according to the first aspect of the present invention located on the bogie beam.

Figure 2:
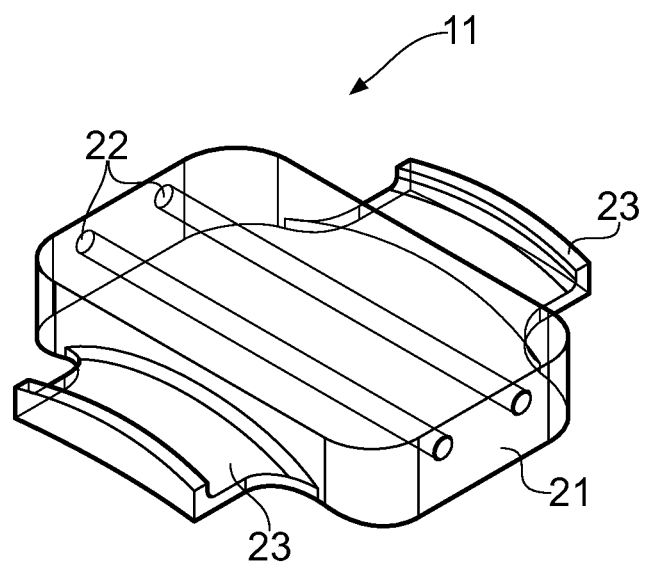
Figure 3:
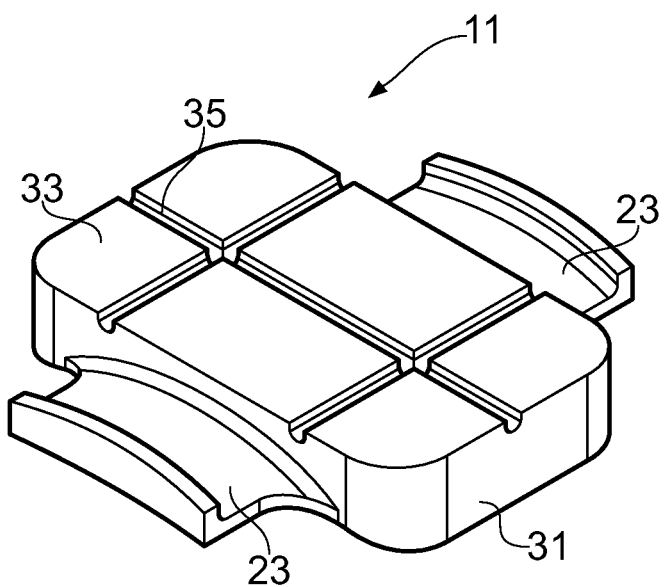
Figure 4:
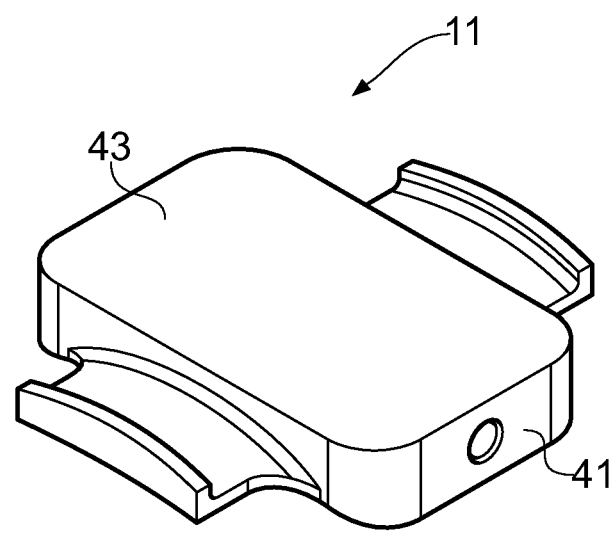
Figure 5:
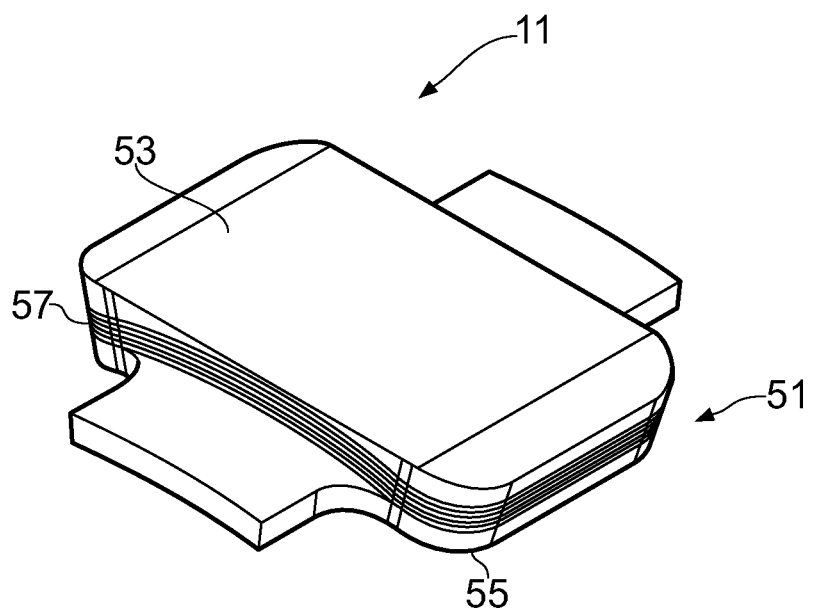
Figure 6:
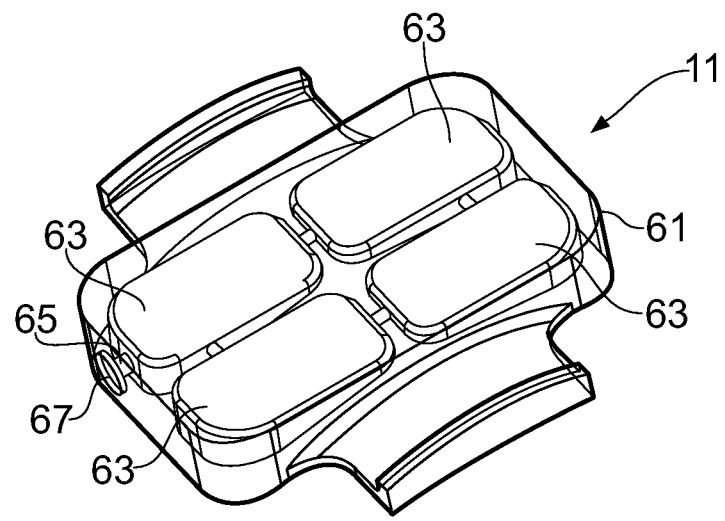
Figure 7:
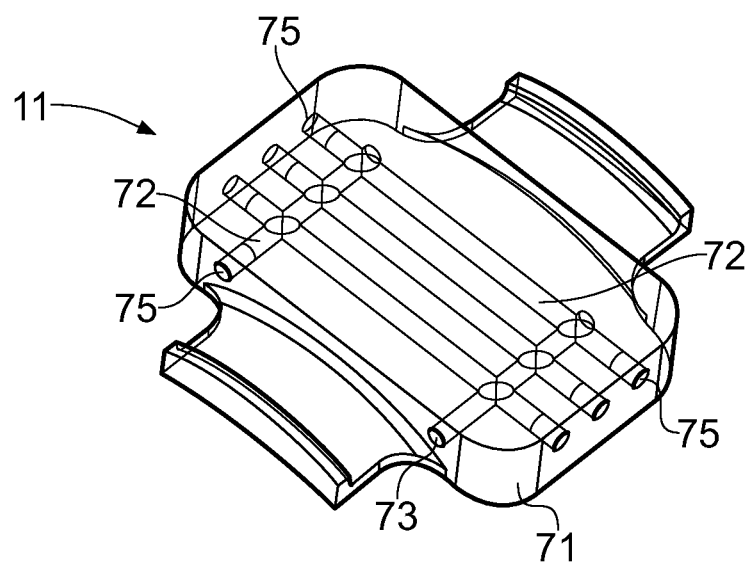
Figure 8:
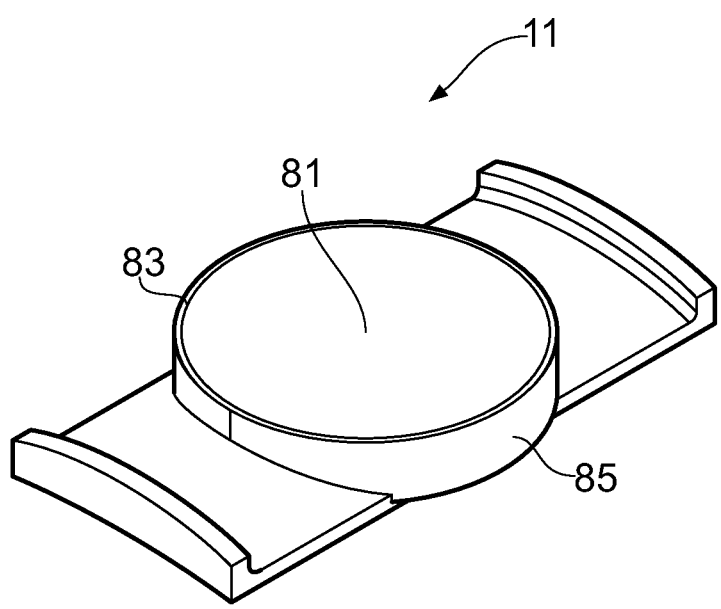

Embodiments of the present invention are described in further detail below, by way of illustrative example only, and with reference to the accompanying figures, of which:

FIG. 1 schematically illustrates a landing gear strut and a bogie beam with a stop block attached to the bogie beam;

FIG. 2 schematically illustrates a stop pad according to a first embodiment of the present invention;

FIG. 3 schematically illustrates a second embodiment of the present invention;

FIG. 4 schematically illustrates a third embodiment of the present invention;

FIG. 5 schematically illustrates a fourth embodiment of the present invention;

FIG. 6 schematically illustrates a fifth embodiment of the present invention;

FIG. 7 schematically illustrates a sixth embodiment of the present invention; and FIG. 8 schematically illustrates a seventh embodiment of the present invention.

Referring to FIG. 1 an aircraft landing gear assembly is schematically illustrated. The landing gear comprises a shock absorber strut 1 that is arranged to be coupled to an aircraft at a first, upper, end and operated to be stowed or deployed in a conventional manner for aircraft landing gear. At the second, lower, end of the shock absorber strut 1 the strut is pivotally coupled to a bogie beam 3. A typical arrangement of the lower end of the shock absorber strut 1 includes a forked yoke 5 extending either side and below the bogie beam 3. A pivot pin 7 pivotally couples the bogie beam 3 to the yoke 5. The bogie beam generally includes two or more wheel axles 9 to which the actual aircraft wheels are fixed. Mounted on an upper surface of the bogie beam 3 is a stop pad 11 positioned such that in the event of over-rotation of the bogie beam the stop pad 11 comes into contact with the inner surface of the yoke 5 of the shock absorbing strut 1, thus preventing the bogie beam 3 itself from striking the yoke. The stop pad 11 is secured to the bogie beam 3 by means of two separate straps 13 in a manner known to the skilled person.

FIG. 2 schematically illustrates a first embodiment of a stop pad according to the present invention. The stop pad has a main body 21 with one or more recesses 22 formed therein. In the particular embodiment illustrated in FIG. 2, each recess 22 comprises a through hole formed in the main body 21 of the stop pad. The main body 21 of the stop pad is formed from a material with a known plastic yield point, i.e. the impact load required to cause plastic deformation of the stop pad. Preferred materials include metals or metallic alloys known to the person skilled in the art, but other known materials may also be used. In the event of the stop pad being formed from a metallic material, the recesses 22 are preferably formed by drilling or other known machining processes. In the particular embodiment illustrated in FIG. 2, when the stop pad 11 is subject to an impact load above the known plastic yield point plastic deformation in the areas weakened by the recesses 22 will occur. The deformation can be determined, for example, by inspection using a clearance gauge to determine if the recesses have been deformed. By matching the plastic yield point of the stop pad with the threshold value for an impact load above which inspection or replacement of the bogie beam is advisable, then deformation of the stop pad provides an indication that an impact above this predetermined threshold level has occurred and that the bogie beam should therefore be further inspected or replaced. The plastic yield point of the stop pad can be determined not only as a function of the stop pad material alone, but also as a function of the size, shape, orientation and location of the recess 22. For example, the plastic yield point will differ depending upon the number of recesses formed in the main body 21 of the stop pad. Whilst the recesses 22 shown in FIG. 2 comprise cross drillings, it will be appreciated that other types of recess may be used. For example, blind holes formed in the underside of the main body 21 may be provided as an alternative to the cross drillings illustrated.

The stop pad 11 preferably includes a pair of attachment arms 23 arranged to receive the straps 13 illustrated in FIG. 1 for attachment of the stop pad to a bogie beam.

FIG. 3 schematically illustrates a further embodiment of a stop pad according to the present invention. The stop pad has a main body arranged to impact against a further element of the landing gear in the event of over-rotation of the bogie beam. The upper surface 33 has one or more recesses 35 formed therein. The main body 31 of the stop pad is formed of a material with a known plastic yield point in an analogous fashion to the stop pad discussed above with respect to the embodiments illustrated in FIG. 2. In the event of an impact against the stop pad above a predetermined threshold level deformation of the upper surface 33 will occur with the deformation occurring first at the recesses 35. For example, the deformation may result in one or more of the recesses 35 having a reduced dimension. The deformation of the recesses 35 can be subsequently determined either just by a visual inspection or by the use of a mechanical gauge. For example, a corresponding male "plug" may be provided having protrusions formed thereon corresponding to the dimensions of the recesses 35 formed in the upper surface 33 of the stop pad when the stop pad is not deformed. Failure to fit the "plug" to the recesses of the stop pad will provide indication that the recesses have been deformed.

The size, shape, orientation and location of the recesses 35 allow the actual impact load required to cause plastic deformation to be further controlled in combination with the inherent plastic yield point of the material from which the stop pad is formed from.

In a further embodiment illustrated in FIG. 4, the stop pad 11 does not have any recesses formed in the upper surface 43 of the stop pad main body 41. In this embodiment an impact above the predetermined threshold level will cause deformation of the stop pad as a whole, such as the formation of one or more indentations in the upper surface 43 of the stop pad. Preferred materials for this particular embodiment of the present invention include porous materials, since their porosity will tend to promote the plastic deformation of the stop pad. Furthermore, the density of the material (related to the porosity), and hence the plastic yield point, of the stop pad can be controlled as a function of parameters of the material manufacturing process. Examples of such porous materials include sintered materials, metallic 'foam' materials, defined porosity castings and honeycomb matrix composite materials.

In further embodiments of the present invention the physical characteristics of any one or more of the previous embodiments illustrated in FIGS. 2, 3 and 4 can be combined, as desired.

A further embodiment of a stop pad according to the present invention is illustrated in FIG. 5. The stop pad 11 has a main body 51 having an upper layer 53 providing the impact surface of the stop pad and a lower layer 55 arranged to be in contact with the bogie beam. Both of these layers are made from relatively hard material that will not deform when subject to an impact between the bogie beam and another element of the landing gear. For example, the upper and lower layers 53, 55 of the stop pad may be a metallic material. In between the upper and lower layers is at least one intermediate layer 57 formed from a different material that exhibits elastic deformation up to a predetermined threshold level and plastic deformation thereafter. An example of such a material would be a polymer. In use, the plastic yield point of the intermediate layer 57 will be chosen such that when the stop pad 11 is subject to an impact load above the predetermined threshold level, at which damage to the bogie beam is likely to occur, the intermediate layer 57 is effectively "squeezed" between the upper and lower metallic layers 53, 55 and consequently undergoes plastic deformation in the form of being extruded from between the upper and lower layers 53, 55 such that at least a portion of the intermediate layer 57 extends beyond the edge of the main body 51 of the stop pad. Impact loadings below the predetermined threshold level will only cause the intermediate layer 57 to undergo elastic deformation and will therefore not cause permanent extrusion of the intermediate layer 57 from between the upper and lower layers 53, 55 of the stop pad. As illustrated in FIG. 5, more than one intermediate layer 57 may be provided, with intervening layers of non-deformable material, such as the metallic material used for the upper and lower layers of the stop pad. By selection of the spacing of the intervening polymer layer 57, a more refined indication of the severity of the impact loading applied to the stop pad can be obtained as a function of the number of intermediate layers 57 that have been extruded from between the respective non-deformable layers of the stop pad, i.e. have undergone plastic deformation. For example, the extrusion of all the provided layers will indicate a very severe impact, whilst only extrusion of the upper most two, for example, layers would indicate a less severe impact load. Furthermore, the plastic yield point of the intermediate layers 57 can differ from one another, either as a function of different polymer materials or as a function of the thickness of the layers, as required to provide the desired indication of impact severity. Equally, the plastic yield point of the intermediate layers 57 may differ from one another so as to provide a consistent behaviour under an impact load despite the dissipation of the impact load forces through the thickness of the stop pad. For example, the plastic yield point of the intermediate layers may decrease from the uppermost layers to the lower layers. The upper, intermediate and lower layers of the stop pad shown in FIG. 7 may be bonded to one another using known bonding agents or may alternatively or additionally be mechanically fastened together, for example by the use of one or more through bolts.

A further embodiment of a stop pad according to the present invention is illustrated in FIG. 6. The main body 61 of the stop pad has a number of individual fluid reservoirs 63 formed internally to the main body, each reservoir 63 being fluidly connected to at least one other. An orifice 65 between the exterior of the stop pad and at least one of the fluid reservoirs 63 is provided, which in the particular embodiment illustrated has a plug 67 forming a fluid tight seal. Contained within the internal reservoir 63 is a fluid. In use, an impact load applied to the upper surface of the stop pad will result in a deformation of the upper surface that in turn will cause compression of the fluid located within the internal reservoir 63. The compressibility of the fluid and the strength of the seal formed by the plug 67 in the orifice 65 are selected such that only when the impact load applied to the upper surface of the stop pad exceeds the predetermined threshold level for a "damaging" impact will the seal fail allowing the compressed fluid contained within the reservoirs to eject the plug 67 and drain out of the stop pad. The leakage of the fluid from within the stop pad in combination with the ejection of the plug 67 provides a visual indication of an impact load above the predetermined threshold level having been applied to the stop pad.

The fluid held within the internal reservoir 63 may, for example, be an incompressible fluid such as hydraulic oil and may optionally be brightly coloured to facilitate the visual identification of leakage. In another embodiment the fluid may comprise a rubber or polymer material similar in nature to that discussed above in connection with the embodiment illustrated in FIG. 5 and used for the intermediate layers 57 of that embodiment. In this case, the extrusion of the polymer through the orifice 65 would provide a visual indication of an impact load above the predetermined threshold level. Optionally, the plug 67 could be omitted in this instance since the polymer fluid would not leak from the reservoirs under normal conditions.

Whilst the particular embodiment illustrated in FIG. 6 has four separate reservoirs 63 shown, a greater or lesser number of reservoirs may be provided as desired and as required to provide the desired degree of structural rigidity to the upper surface of the stop pad. For example, if the predetermined threshold level of impact load is relatively low then sufficient structural rigidity to the stop pad may be achievable with a single central reservoir 63 formed within the main body 61 of the stop pad. The number of reservoirs, their size and shape further allow the compressibility of the stop pad to be tuned in combination with the compressibility of the fluid selected to be held within the reservoirs.

Further embodiments of a stop pad 11 according to the present invention is illustrated in FIG. 7. In a similar fashion to the stop pad illustrated in FIG. 2, in the embodiment illustrated in FIG. 7 the stop pad 11 has a number of recesses 72 formed within the main body 71 of the stop pad. The recesses may be formed, for example, by drilling into or through the main body 71 of the stop pad. However, the recess 72 is blind, meaning that, with the exception of a single opening 73, none of the recesses 72 are open to the exterior of the stop pad 11. This can be achieved, for example, by simply machining a blind recess, or as illustrated in the particular embodiment shown in FIG. 7, by forming a plurality of interconnected cross drillings and subsequently forming a seal 75 in all but one of the openings formed by the cross drillings. The blind recess(es) 72 is formed to promote the generation of one or more fractures between the recess and the outer surface of the stop pad in the event of an impact load being applied above the predetermined threshold level. In addition to visual indications of such fractures, a pressurized fluid, such as compressed air, can be applied to the single opening 73 of the recess and any subsequent loss of pressure noted, the pressure loss being caused by escape of the pressurized fluid through the fractures. The impact load required to cause a fracturing of the stop pad can be predetermined as a function of one or more of the size, location, orientation and number of interconnected recesses 72 formed within the main body of the stop pad.

A further embodiment of a stop pad according to the present invention is illustrated in FIG. 8. The stop pad 11 has a main body 81 that is arranged to directly receive an impact load in the event of over-rotation of the bogie beam. The main body 81 of the stop pad is made from a material, such as rubber or polymer, that undergoes elastic deformation at least up to an impact load corresponding to the predetermined threshold level corresponding to an unacceptably high impact. A first band 83 of further material is formed around a periphery of the main body 81 of the stop pad. The first band 83 is formed from a material having a relatively high elongation to failure ratio, such as a braided woven material. The relatively high elongation to failure ratio of the first band 83 allows the band to expand as the main body 81 elastically deforms when subjected to an impact load. A second band 85 of a further material is formed around the first band 83. The second band 85 is formed from a material having a lower elongation to failure ratio in comparison with the first band. For example, the second band 85 may be formed from a straight wound fibre material. The elongation to failure ratio of the second band 85 is selected such that when the main body 81 of the stop pad is subject to an impact load above the predetermined threshold level the deformation of the main body 81 causes the first band 83 to expand (but not to fail), which in turn causes the second band 85 to expand beyond its failure point and therefore rupture. The rupture in the second band 85 provides a visual indication that the stop pad 11 has been subject to an impact load above the predetermined threshold level. To increase the visibility of the fracture, the first and second bands 83, 85 may have contrasting colours to allow the first band 83 to be easily seen through the rupture in the second band 85.

To promote or restrain deformation of the main body 81 in a direction to cause expansion of the first and second bands (i.e. in a radial direction for the particular geometry of stop pad illustrated in FIG. 8), one or both of an upper and lower plate may be secured over the main body, first and second bands.

Whilst the stop pad 11 illustrated in FIG. 8 is shown as substantially circular, it will be appreciated that other geometries may be adopted as desired. For example, the stop pad may be elliptical or oval in shape. Equally, more than one sub-assembly of a main body, first and second bands may be provided to form the entirety of the stop pad. For example, an array of four such circular sub-assemblies may be provided.

A stop pad according to embodiments of the present invention performs not only as a regular stop pad, but additionally provides an indication that the stop pad, and therefore components which the stop pad is protecting, has been subject to an impact where the loads exceed a predetermined level. The stop pad indicates that it has been exposed to such impact loads, by visual, measurement or testing means. This easily allows the occurrence of such an impact load to be identified and any remedial action taken.

What is claimed is:

1. A stop pad for an aircraft landing gear arranged to provide protection against impact between first and second elements of the landing gear, the stop pad being arranged to provide an indication that it has been subjected to an impact against one of the first or second landing gear elements, the impact having an impact load above a predetermined threshold level.

2. A stop pad according to claim 1, wherein said indication is a visual indication.

3. A stop pad according to claim 2, wherein said visual indication may comprise the deformation of one or more external surfaces of the stop pad.

4. A stop pad according to claim 3, wherein an external surface of the stop pad may have one or more recesses formed therein and the visual indication comprises the deformation of at least one of these recesses.

5. A stop pad according to claim 3, wherein the stop pad may comprise a porous material and the plastic yield point of the porous material is determined as a function of the materials porosity.

6. A stop pad according to claim 2, wherein the visual indication may comprise at least partial egress of a substance from the stop pad.

7. A stop pad according to claim 6, comprising at least one layer of said substance extending to an edge of the stop pad, wherein the substance has a plastic yield point equal to the predetermined threshold level such that when the stop pad is subject to an impact load above the predetermined threshold level, at least a portion of the layer of said substance is extruded beyond the edge of the stop pad.

8. A stop pad according to claim 7 comprising multiple layers of said substance.

9. A stop pad according to claim 8, wherein two or more of the multiple layers have different plastic yield points.

10. A stop pad according to claim 6, wherein the stop pad comprises at least one internal cavity in which said substance is arranged to be located and at least one external orifice connected to the internal cavity, the internal cavity being arranged to be compressed when the stop pad is subject to an impact load such that at least some of the substance is urged out of the orifice when the impact load exceeds the predetermined threshold level.

11. A stop pad according to claim 10, wherein said substance has a plastic yield point equal to the predetermined threshold level.

12. A stop pad according to claim 10, wherein said substance comprises a fluid and said orifice is fluidly sealed by sealing means, the sealing means being arranged to allow egress of the fluid through the orifice when the stop pad is subject to an impact load above the predetermined threshold level.

13. A stop pad according to claim 12, wherein the fluid comprises an incompressible fluid.

14. A stop pad according to claim 12, wherein the stop pad comprises a plurality of fluidly connected internal cavities.

15. A stop pad according to claim 2, comprising: a main body arranged to arranged to elastically deform when subjected to an impact load; a first band formed around a periphery of the main body and arranged to expand as the main body deforms; and a second band formed around the first band and arranged to rupture when the first band expands by a predetermined extent corresponding to the extent of expansion caused by the deformation of the main body when the stop pad is subjected to an impact load exceeding the predetermined threshold level.

16. A stop pad according to claim 15, further comprising at least one plate formed across the main body to inhibit deformation of the main body in a direction substantially normal to the plate.

17. A stop pad according to claim 15, wherein the main body, first and second bands are substantially circular.

18. A stop pad according to claim 15 wherein the first band includes braided fibers.

19. A stop pad according to 15, wherein the second band includes linear wound fibers.

20. A stop pad according to claim 15, wherein the main body comprises a rubber or polymer material.

21. A stop pad according to claim 1 including at least one recess formed in the stop pad, the recess being arranged to plastically deform when the stop pad is subjected to an impact load above the predetermined threshold, the deformation of the recess providing said indication.

22. A stop pad according to claim 21, wherein the recess comprises a hole formed through the stop pad.

23. A stop pad according to claim 21, wherein the occurrence of deformation of the recess is controlled by one or more of the size, shape, orientation and location of the recess.

24. A stop pad according to claim 1, wherein the stop pad has at least one blind recess formed therein, the blind recess being arranged to promote a fracture forming in the stop pad when the stop pad is subject to an impact load above the predetermined threshold, the fracture allowing the escape of a pressurized fluid introduced into the recess to provide said indication 25. A stop pad according to claim 24, wherein the blind recess comprises one or more connected holes formed through the stop pad, with each end of the holes except one being sealed.

26. A stop pad according to claim 24, wherein the formation of a fracture is controlled by one or more of the set consisting of size, shape, orientation and location of the recess.

27. An aircraft landing gear comprising: a bogie beam, at least one additional landing gear element, and a stop pad located on the bogie beam, the stop pad arranged to provide protection against impact between the bogie beam and the at least one additional landing gear element and to provide an indication that the stop pad has been subjected to an impact against the at least one additional landing gear element, the impact having an impact load above a predetermined threshold level.

* * * * *